US008346930B2

(12) United States Patent
Johannesson et al.

(10) Patent No.: US 8,346,930 B2
(45) Date of Patent: Jan. 1, 2013

(54) MULTIMEDIA PROCESSING METHOD AND DEVICE FOR RESOURCE MANAGEMENT USING VIRTUAL RESOURCES

(75) Inventors: Thomas R. Johannesson, Linköping (SE); Daniel Helmers, Solna (SE)

(73) Assignee: General Instrument Corporation, Horsham, PA (US)

( * ) Notice: Subject to any disclaimer, the term of this patent is extended or adjusted under 35 U.S.C. 154(b) by 505 days.

(21) Appl. No.: 11/746,370

(22) Filed: May 9, 2007

(65) Prior Publication Data

US 2007/0266123 A1 Nov. 15, 2007

Related U.S. Application Data

(60) Provisional application No. 60/800,124, filed on May 12, 2006.

(51) Int. Cl.
*G06F 15/16* (2006.01)
*G06F 15/177* (2006.01)
*H04N 7/16* (2011.01)
*H04N 7/173* (2011.01)

(52) U.S. Cl. ........ 709/226; 709/204; 709/206; 709/220; 709/229; 709/231; 725/2; 725/4; 725/100

(58) Field of Classification Search .................. 709/204, 709/206, 220, 226, 229, 231; 725/2, 4, 100, 725/110, 145
See application file for complete search history.

(56) References Cited

U.S. PATENT DOCUMENTS

| 5,819,043 | A | * | 10/1998 | Baugher et al. | ............... 709/222 |
| 5,996,025 | A | * | 11/1999 | Day et al. | ...................... 719/328 |
| 2003/0184592 | A1 | * | 10/2003 | Awada et al. | ................. 345/788 |
| 2004/0172574 | A1 | * | 9/2004 | Wing et al. | ....................... 714/4 |
| 2006/0244839 | A1 | * | 11/2006 | Glatron et al. | ........... 348/211.11 |
| 2008/0215796 | A1 | * | 9/2008 | Lam et al. | ..................... 711/100 |

* cited by examiner

*Primary Examiner* — Wing Chan
*Assistant Examiner* — Farrukh Hussain
(74) *Attorney, Agent, or Firm* — Stewart M. Wiener

(57) ABSTRACT

A multimedia processing device and method for using virtual resources to manage multimedia content system resources and access to such resources by system applications. A multimedia content processing device, such as a set-top box, is configured to provide virtual resources that emulate actual resources, such as a media playing resource, in a manner that allows system applications, such as a television or video on demand application, to believe they have access to the actual underlying system resource. The method includes providing a virtual resource for a system application seeking access to a system resource. The virtual resource can be configured in an attached mode, in which the virtual resource forwards information between an active system application and the accessed resource. The virtual resource also can be configured in a detached mode, in which the virtual resource emulates the actual resource to which a non-active system application is seeking access.

20 Claims, 4 Drawing Sheets

MULTIMEDIA PROCESSING METHOD AND DEVICE FOR RESOURCE MANAGEMENT USING VIRTUAL RESOURCES

CROSS-REFERENCE TO RELATED APPLICATION

This application claims priority to the filing date of a U.S. provisional patent application having Ser. No. 60/800,124, entitled "VIRTUAL RESOURCES—A RESOURCE MANAGEMENT SCHEME FOR EMBEDDED SYSTEMS", filed on May 12, 2006, which is incorporated herein by reference in its entirety.

BACKGROUND OF THE INVENTION

1. Field of the Invention

The invention relates to multimedia processing devices, such as set-top devices. More particularly, the invention relates to resource management methods for multimedia processing devices and multimedia processing devices configured with one or more resource management methods.

2. Description of the Related Art

Multimedia processing devices, such as video and multimedia converter/decoder (set-top box) devices, process received multimedia content for subsequent display to an end user, e.g., via an end user display device, such as a television screen or computer monitor. One type of multimedia processing device is an Internet Protocol Set-Top Box (IP-STB), which is a set-top box or other multimedia processing device that can use a broadband network to connect to television channels, video streams and other multimedia content.

Multimedia processing devices are configured and have the ability to run various applications, such as television applications, electronic program guide (EPG) applications, video on demand (VOD) applications, and other applications and programs that can interact with a system end user. Some multimedia processing devices, such as IP-STB devices, also can run web browsing applications and other web-based applications.

Some multimedia processing devices, including many IP-STB devices, include a multi-application platform, which allows the device to operate within a multi-application environment, i.e., several applications can be running on the device at the same time. However, within a multi-application environment, at any one time, only one application can be active and interacting with the end user. Although several applications can or may be visible, e.g., on an end user display device, only one application is active. Typically, the active application is the application that receives end user input and is shown on top of the other applications. For example, the end user display device and other system resources, such as the interactive remote control device, are allotted to the active application.

A resource or system resource typically can be any system component within the multimedia processing device, such as a transport stream demultiplexor or one or more MPEG (Moving Pictures Experts Group) decoders. System resources also can include or be part of other system devices or components associated with or connected to the multimedia processing device, such as the end user display device, e.g., a television screen or computer monitor.

Some resources in a multimedia processing device and within the overall system are relatively scare. Accordingly, all applications in a multi-application environment can not have access to the same resource at the same time, although, from an application programmer's point of view, such access would be desirable. Therefore, within multi-application environments or platforms, there often is a need to manage resource access or resolve resource processing conflicts.

DETAILED DESCRIPTION

Figure 1:
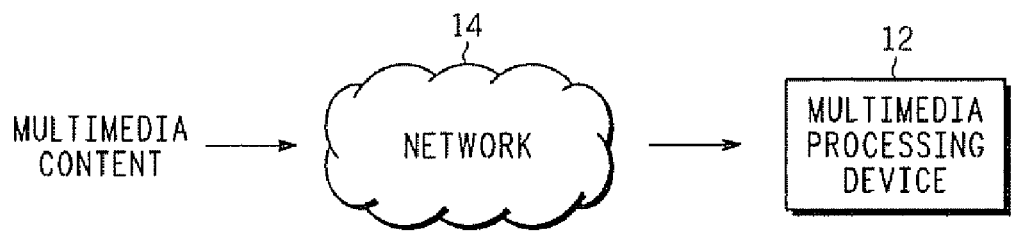
FIG. 1 is a block diagram of a system for use in managing access to multimedia content system resources by multimedia content system applications.

In the following description, like reference numerals indicate like components to enhance the understanding of the resource management devices and methods using virtual resources through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The devices and methods described herein involve the use of virtual resources to manage resource access and/or resolve resource processing conflicts. A multimedia content processing device can be configured to provide and make use of virtual resources that can emulate actual resources in a manner that allows multimedia content system applications, such as television and video on demand (VOD) applications, to believe that they have access to actual (desired) underlying system resources, such as media playing resources and other system resources, even if the particular system application does not have such access. The virtual resource can act or operate in an "attached" mode or a "detached" mode. When the virtual resource is in the attached mode, the virtual resource forwards or passes through information between an associated active system application and the actual underlying system resource to which the active application is accessing. When the virtual resource is in the detached mode, the virtual resource emulates the actual underlying resource to which the non-active (inactive) application is seeking access. System resource emulation by a virtual resource can involve receiving application information from a non-active system application, providing application information to a non-active system application, and/or generating or storing application information to provide to a non-active system application when the application becomes active. Through the use of virtual resources, system applications believe that they have access to media playing resources, and/or other system resources, even though only the active application has such access. Advantageously, the use of virtual resources eliminates the need for system applications to be concerned about or responsible for system resource management and managing access to system resources.

Referring now to FIG. 1, shown is a block diagram of a system 10 for use in managing access to multimedia content system resources by multimedia content system applications. The system 10 includes a multimedia content source or server (not shown) for providing multimedia content, and a multimedia processing device 12 configured for receiving multimedia content.

The multimedia content source or server can be any suitable transmission source of multimedia content, such as over-the-air broadcasters, from a cable television plant, satellite service provider or other multimedia service provider. The multimedia content source can be connected to the multimedia processing device 12 via any suitable connection, e.g., one or more coaxial cables and/or optical fibers, including a Hybrid Fiber Coaxial (HFC) cable system. Other suitable connections include suitable Fiber To The Premises (FTTP) systems, such as Fiber To The Curb (FTTC) or Fiber To The Home (FTTH), over any suitable number of digital subscriber line systems (xDSL), or over a wired or wireless Internet Protocol (IP) connection. Also, the multimedia content source can provide multimedia content wirelessly, e.g., via over-the-air-broadcast from a satellite service provider or other suitable content service provider.

The multimedia content can be any suitable multimedia content, such as broadcast video, including movies, programming events and/or other multimedia content that is distributed, e.g., as one or more programming streams. Multimedia content can include one or more system applications, such as a television application, a video on demand (VOD) application, an electronic program guide (EPG) application, and other suitable applications, such as teletext applications, web/portal browser applications and settings applications. The multimedia content system applications include the actual program commands and instructions that interact with the multimedia processing device 12 and its end users.

Multimedia content typically exists as a plurality of digital signals formatted according to a suitable standard, such as the MPEG-2 (Moving Picture Experts Group) or MPEG-4 standard, and multiplexed into a data stream that is modulated on a carrier using quadrature amplitude modulation (QAM) or other suitable modulation technique. Such multimedia content typically is broadcast, multicast (e.g., IP multicast) or otherwise transmitted in the form of one or more program channels of multimedia content. However, multimedia content also can be delivered to an end user point-to-point, e.g., in response to an end user request to an on-demand system or from a local or remote end user library.

The multimedia processing device 12 can be coupled to the multimedia content source via one or more networks 14. The network 14 can be any communication network or network server arrangement suitable for transmitting multimedia content to one or more multimedia processing devices 12. For example, the network 14 can be or include the Internet or an Internet protocol (IP) based network, or other suitable public network. The network 14 also can be or include a computer network, a web-based network or other suitable wired or wireless network or network system, including in-home personal networks.

Figure 2:
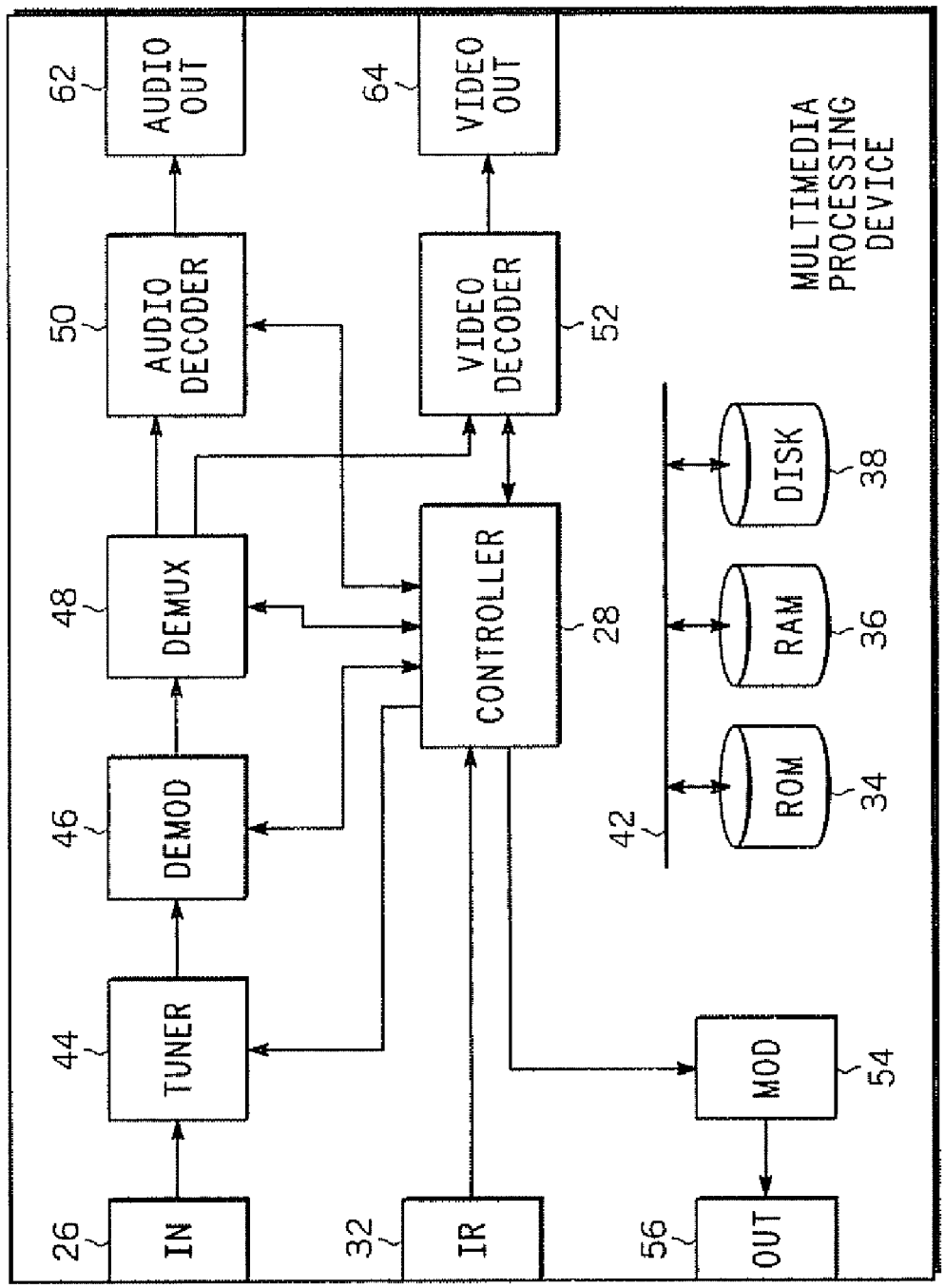
FIG. 2 is a block diagram of a multimedia processing device for use in managing access to multimedia content system resources by multimedia content system applications.

Referring now to FIG. 2, shown is a block diagram of a multimedia processing device, such as the multimedia processing device 12, for use in managing access to multimedia content system resources by multimedia content system applications. The multimedia processing device 12 can be partially or completely any suitable device or subsystem (or portion thereof) for receiving multimedia content from the multimedia content source, processing or decoding the received multimedia content and/or transmitting or transferring the processed multimedia content, including stored multimedia content, to an end user display (not shown), such as a television, a computer monitor or other suitable display device. The end user display device typically is a separate component from the multimedia processing device 12, although the multimedia processing device 12 and an end user display device can be combined or integrated as a single component.

Suitable multimedia processing devices include any multimedia content viewing, processing and/or storing device, such as any digital video recorder (DVR) or digital video server (DVS) device, including signal converter or decoder (set-top) boxes with internal and/or external recording capabilities and local and/or remote storage, which often are referred to as personal video recorder (PVR) devices. Other suitable multimedia processing devices include a residential gateway, a home media server system, a digital video disk recorder, a computer, a television with built-in or added-on video content receiving and storing capability, or other suitable computing devices or video devices, including internet protocol (IP), satellite and cable digital video recorders, and home area network (HAN) systems.

The multimedia processing device 12 includes an input port or interface 26 for receiving multimedia content, e.g., from the multimedia content source. As discussed hereinabove, the multimedia content typically is a QAM-modulated MPEG2 or MPEG4 digital stream from a suitable multimedia content source. However, the multimedia content can be analog or digital content. If the multimedia content is analog, an MPEG encoder or other suitable encoder (not shown) can be included as part of the multimedia processing device 12.

The multimedia processing device 12 includes a controller or processing unit 28. In general, the controller 28 processes information received by the multimedia processing device 12. The controller 28 can include at least one type of memory or memory unit (not shown) and a storage unit or data storage unit coupled to the processor for storing processing instructions and/or information received by the multimedia processing device 12. The controller 28 can be central processing unit (CPU) that includes any digital processing device, such as a microprocessor, finite state machine (FSM), digital signal processor (DSP), application specific integrated circuit (ASIC) and/or general purpose computer. The controller 28 typically receives commands from the end user, such as through infrared (IR) reception of commands from a hand-held remote control device (not shown) through an IR receiving circuit 32. The controller 28 decodes the commands and forwards control signals to other circuits in the multimedia processing device 12 to carry out the commands, such as changing the channel.

The multimedia processing device 12 can include a read only memory (ROM) 34 containing software and fixed data used for operating the multimedia processing device 12, and a random access memory (RAM) 36 for storing changeable data. The multimedia processing device 12 also can include a separate internal or external large memory device, such as a hard disk drive or other storage element 38 for storing relatively large amounts of multimedia content. Alternatively, the hard disk can be any suitable information storage unit, such as any suitable magnetic storage or optical storage device, including magnetic disk drives, magnetic disks, optical drives, optical disks, and memory devices, including flash memory. The controller 28, the ROM 34, the RAM 36 and the hard disk 38 are coupled to a master bus 42 over which the units can communicate with each other.

The multimedia processing device 12 includes and/or is associated with one or more system resources for processing multimedia content. A system resource typically can be any system component within the multimedia processing device, such as a transport stream demultiplexor or one or more MPEG decoders, as will be discussed in greater detail hereinbelow. Other system resources can include a multimedia content streamer, a multimedia content media player, a multimedia content encoder and a multimedia content decoder. Alternatively, system resources also can include or be part of other system devices or components associated with or connected to the multimedia processing device 12, such as the end user display device, e.g., a television screen or computer monitor.

Within the multimedia processing device 12, received multimedia content from the input port 26 passes through a tuner or tuning circuit 44. Under control of the controller 28, the tuning circuit 44 selectively parses out the data corresponding to the particular channel selected by the viewer or end user. The selected data is passed to a demodulator 46, which demodulates the data. It should be understood that the tuning circuit 44 and the demodulator 46 can be a single component or processing circuit.

The demodulated multimedia content data passes to a demultiplexor (demux) 48, such as an MPEG2 transport stream parser (TPP). The demodulated multimedia content data passes to the demux 48 directly from the demodulator 46 and/or through the controller 28. The demux 48 receives the demodulated multimedia content and separates or demultiplexes the audio and video portions of the multimedia content.

An audio decoder 50 processes the MPEG audio stream and produces an analog audio signal. A video decoder 52 decompresses the MPEG video and generates a video sequence. After decoding, the demultiplexed information can be stored in memory buffers to form a data stream. In such case, the audio decoder 50 and the video decoder 52 can pass the decoded multimedia content to one or more of the memory devices 36, 38 through the controller 28. The audio and video portions of the multimedia content also are forwarded to an audio output port or interface 62 and a video output port or interface 64, respectively. The audio output interface 62 and the video output interface 64 transfer the processed multimedia content, including stored multimedia content, to an end user display device (not shown), such as a television screen or a computer monitor.

Depending on the particular features of the multimedia processing device 12, the multimedia processing device 12 may include a modulator 54 coupled to the controller 28 for modulating data generated by various system resources in the multimedia processing device 12 and/or the controller 28 for transmission upstream. The modulator 54 is coupled to an output port or interface 56, which can be coupled to the network 14 or other appropriate connection. It should be understood that the interface 26 and the interface 56 can be the same physical port, i.e., the interface 26 and the interface 56 can be a single input/output interface.

One or more of the controller 28, the IR receiving circuit 32, the ROM 34, the RAM 36, the hard disk 38, the master bus 42, the tuner 44, the demodulator 46, the demux 48, the audio decoder 50, the video decoder 52, the modulator 54 and the interfaces 26, 32, 56, 62, 64 can be comprised partially or completely of any suitable structure or arrangement, e.g., one or more integrated circuits. Also, it should be understood that the multimedia processing device 12 includes other components, hardware and software (not shown) that are used for the operation of other features and functions of the multimedia processing device 12 not specifically described herein.

The multimedia processing device 12 can be partially or completely configured in the form of hardware circuitry and/or other hardware components within a larger device or group of components. Alternatively, the multimedia processing device 12 can be partially or completely configured in the form of software, e.g., as processing instructions and/or one or more sets of logic or computer code. In such configuration, the logic or processing instructions typically are stored in a data storage device, e.g., the ROM 34, the RAM 36 and/or the hard disk 38 or other suitable data storage device (not shown). The data storage device typically is coupled to a processor or controller, e.g., the controller 28, or other suitable processor or controller (not shown). The processor accesses the necessary instructions from the data storage device and executes the instructions or transfers the instructions to the appropriate location within the multimedia processing device 12.

Figure 3:
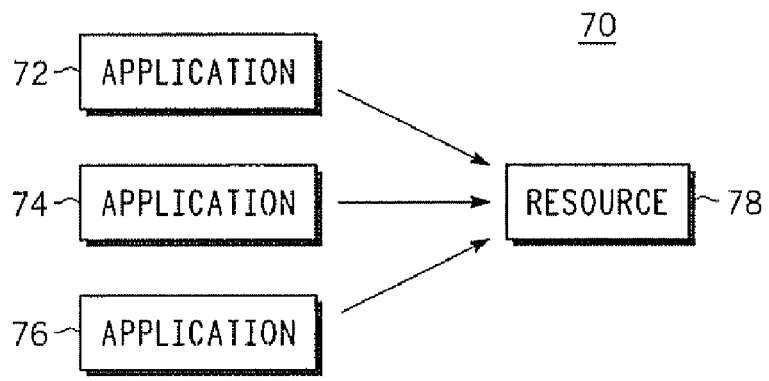
FIG. 3 is a block diagram showing conventional access by a plurality of multimedia content system applications to a system resource.

As discussed hereinabove, some multimedia processing devices support a multi-application environment, i.e., the multimedia processing device is configured to allow several system applications to be running at the same time. However, in such multi-application environments, several different system applications often are seeking access to the same system resource at the same time. Referring now to FIG. 3, shown is a block diagram 70 showing a plurality of multimedia content system applications 72, 74, 76 seeking access to a system resource 78 in a conventional manner. As discussed hereinabove, only one application can be active at any given time, therefore only one of the system applications 72, 74, 76 seeking access can actually have access to the system resource 78 at any one time.

With respect to granting access to a single system resource by more than one system application, access management of some system resources can be handled in a relatively straightforward manner. For example, for an end user display device, the application is either shown or not shown. For an end user interactive remote control device, the application input either is received and processed, or not received. Access to some resources, e.g., a video window system resource, can be accomplished by simply storing the settings (e.g., size and position) and other parameters for each requesting application, and changing the particular set of settings and parameters of the video window, depending on which application is the active application.

However, access to some system resources, e.g., media playing resources and transport stream demultiplexors, can not be handled as easily. For example, consider a scenario in which two full-screen applications are using the media playing resources at the same time and the end user is switching between the applications, e.g. a VOD application (watching unicasted video) and a TV application (watching multicasted video). If the multimedia content processing device supports the demultiplexing of only one MPEG-2 transport stream and the decoding of only one MPEG-2 video stream, only one of the two system applications can access the system resources.

As will be discussed in greater detail hereinbelow, one or more virtual resources can be created or provided to emulate actual system resources in a manner that allows non-active system applications to believe that they always have access to or are accessing an underlying system resource. The virtual resource can act or operate in a "detached" mode, in which the virtual resource emulates the actual underlying resource to which a non-active system application is seeking access. Alternatively, the virtual resource can act or operate in an "attached" mode, in which the virtual resource forwards information between an active system application and the actual underlying system resource to which the application has access.

Figure 4:
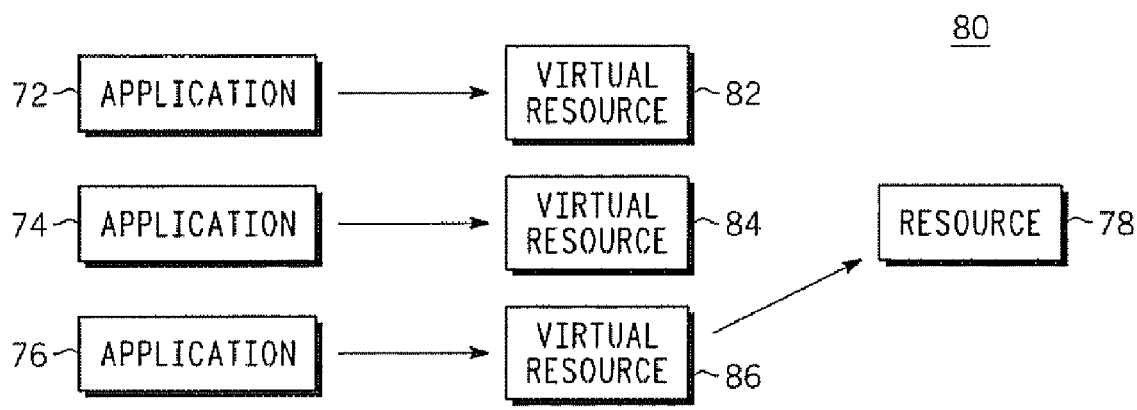
FIG. 4 is a block diagram showing access by a plurality of multimedia content system applications to a system resource using virtual resources.

Referring now to FIG. 4, shown is a block diagram 80 showing the plurality of multimedia content system applications 72, 74, 76 seeking access to the same system resource 78 using a plurality of virtual resources 82, 84, 86 corresponding to the plurality of applications 72, 74, 76. As discussed, virtual resources can emulate actual resources in a manner that causes a system application to think that it always has access to the actual system resource, even if the particular system application does not have such access. Thus, the particular system application does not have to determine whether the application has access or when the application will be granted access to a particular system resource. Accordingly, the process of system resource management does not fall on the particular system applications. Keeping the burden of resource management out of the control of the individual system applications is advantageous for the overall system because different system applications can be written by different parties, and often without consideration for additional system applications that also may be operating in the same multi-application environment. Moreover, the individual system application does not have to be aware of its own state, and the system application always believes it has full access to the resource or resources it needs or is seeking.

Some multimedia content processing devices are configured with an operating system that includes a Media Manager or Media Service module or platform, which may include a streamer or other operating system process that handles media stream processing, including playing and/or recording of multimedia content received by the multimedia content processing device. The Media Manager can be used by various system applications to create one or more media players or media player instances, although typically only one media player can be active at any given time. The Media Manager typically is part of the controller 28 and/or other suitable component or components within the multimedia content processing device 12, e.g., in the form of software and/or hardware.

In general, the Streamer (or other media stream processing) is responsible for reading the multimedia content stream received by the multimedia content processing device and detecting the transport format. If the multimedia content is an MPEG-2 transport stream, the Streamer will feed the transport stream to the appropriate system resource, such as the demultiplexor 54, the audio decoder 50, the video decoder 52 and/or other suitable system resources, including system resources that may not be contained within the multimedia content processing device, such as an end user display device.

Figure 5:
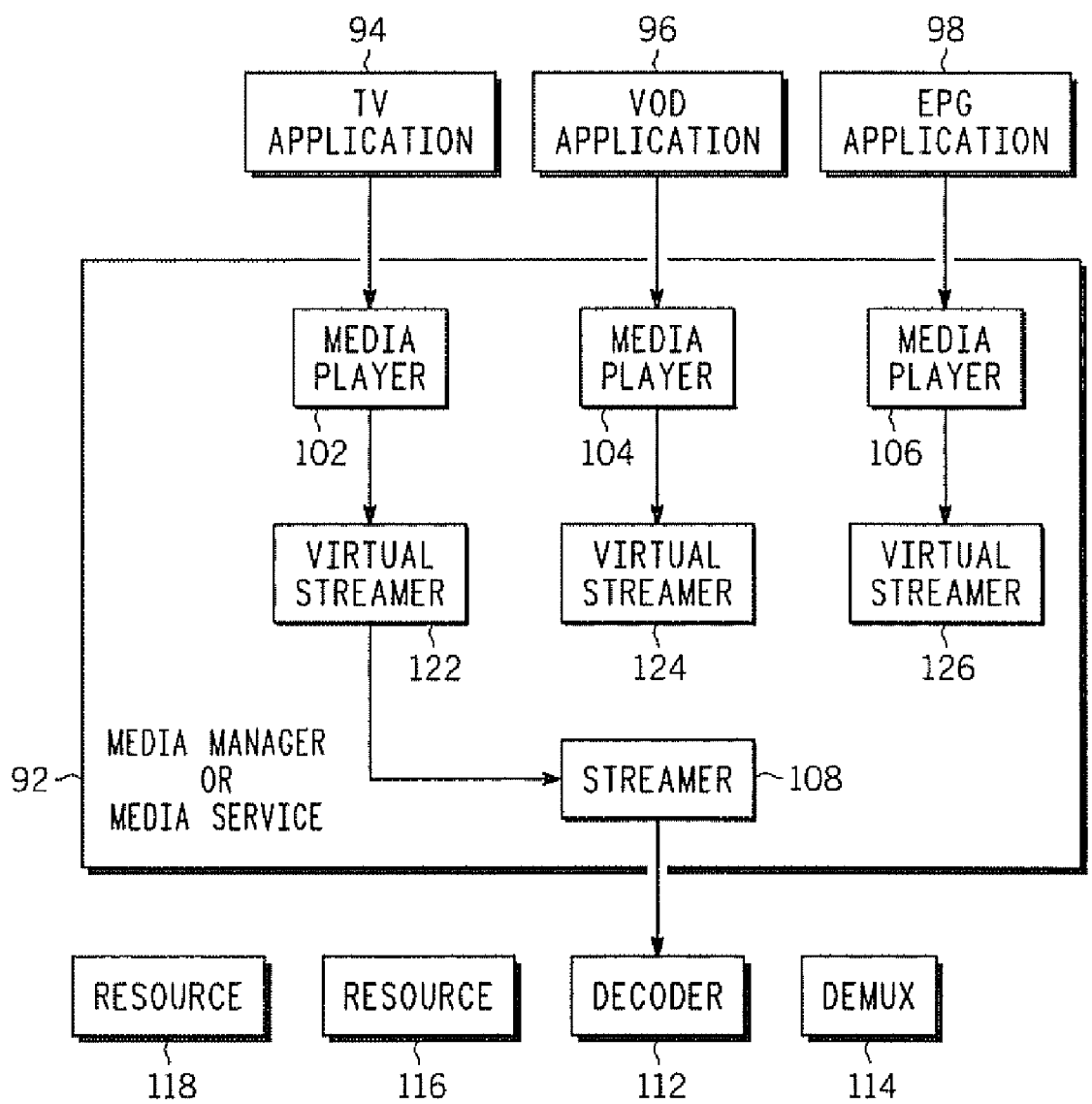
FIG. 5 is a block diagram of a media service or media manager using virtual resources to manage access to multimedia content system resources by a plurality of system applications.

Referring now to FIG. 5, shown is a block diagram 90 of a Media Manager or Media Service 92 using virtual resources to manage access to multimedia content system resources by a plurality of system applications. In general, the Media Manager receives multimedia content, e.g., from the network 14. Also, the Media Manager communicates with one or more system applications, such as a TV application 94, a VOD application 96 or an EPG application 98. One or more of the system applications can be running on or within the multimedia content processing device 12, although such is not necessary.

As discussed, the Media Manager 92 can create a media player for each application. Therefore, as shown, for a Media Manager that can receive multimedia content from the TV application 94, the VOD application 96 and the EPG application 98, a first media player 102 can be created to correspond to the TV application 94, another media player 104 can be created to correspond to the VOD application 96, and yet another media player 106 can be created to correspond to the EPG application 98.

The Media Manager 92 includes a Streamer 108, or other appropriate media processing instrument, that handles media stream processing, e.g., by coupling the appropriate media player to the appropriate system resource, depending on which application is active and which applications are non-active. That is, the Streamer 108 will couple one of the system media players 102, 104, 106 to an appropriate system resource, e.g., a decoder 112, a demultiplexor 114, or other suitable resource, which are shown generally as a system resources 116, 118. Also, the Streamer 108 itself can be considered a system resource, in addition to the system resources 112-118.

Thus, for example, in the Media Manager 92, a virtual streamer resource can be provided, created or allotted for each of the applications, i.e., a first virtual streamer 122 corresponding to the media player 102, a second virtual streamer 124 corresponding to the media player 104, and a third virtual streamer 126 corresponding to the media player 106. However, although each application has an allotted virtual streamer, only one of the virtual streamers can be connected to the actual Streamer or streaming process at any given time, since only one application can be active at any given time. For the active application, the corresponding virtual streamer resource will be attached or in an attached mode, and thus will forward information between the active application and the actual resource. For example, all calls to a virtual streamer will be forwarded to the real Streamer 108. For the non-active applications, e.g., applications running in the background, the corresponding virtual resources will be in a detached mode and thus will emulate the underlying system resource to which their respective applications are seeking access.

Therefore, in FIG. 5, in which the TV application 94 (and its media player 102) is shown as the active application, the corresponding virtual resource (i.e., the virtual streamer 122) is in the attached mode. Accordingly, the virtual streamer 122 forwards application information between the TV application media player 102 (the TV application 94) and the Streamer 108. For non-active applications, e.g., the VOD application 96 and the EPG application 98, their respective virtual resources (virtual streamers) are each in the detached mode. Accordingly, the virtual streamer 124 emulates the Streamer 108 for the benefit of the VOD application 96 and its media player 104. Similarly, the virtual streamer 126 emulates the Streamer 108 for the EPG application 98 and its media player 106.

For example, in the detached mode, the virtual streamer 124 may emulate the Streamer 108 by calculating the playback position in response to the associated application (i.e., the VOD application 96) asking for the current position in the multimedia content stream. Also, any commands given to the media player associated with the non-active applications will be processed by the associated virtual streamer. Such commands can include pause, replay, fast forward and other trick play functions that can be performed on the multimedia content. Thus, if the application fast forwards the playback of the multimedia content, the Streamer 108 will begin fast forwarding the application multimedia content when the application becomes active (again). Similarly, the associated virtual streamer may emulate the Streamer 108 by handling any end-of-stream functions, e.g., if the calculated position reached the end of the multimedia content stream (or the beginning if rewinding). In such case, the virtual streamer will inform the Media Manager 92 that the end of the multimedia content stream has been reached. The Media Manager 92 will, in turn, inform the appropriate application providing the multimedia content.

When the active application is switched from one application to another application, e.g., the end user switches to a different application, the Media Manager 92 is informed of the switch and the virtual streamer (or other virtual resource) associated with the newly-active application becomes coupled to the Streamer 108 (or other resource). Thus, the newly-active application now has access to the hardware (and software) of the actual system resource.

For applications that become active, the virtual streamer is configured to instruct the Streamer 108 to start (or resume) playback at a particular (calculated) position, as if the application has been operating all along. For example, for the VOD application 96, the virtual streamer 124 will instruct the Streamer 108 to start or resume playback at a calculated position that indicates in which position the VOD application 96 would be if the playback of the VOD application 96 had been going on all the time in the background.

Figure 6:
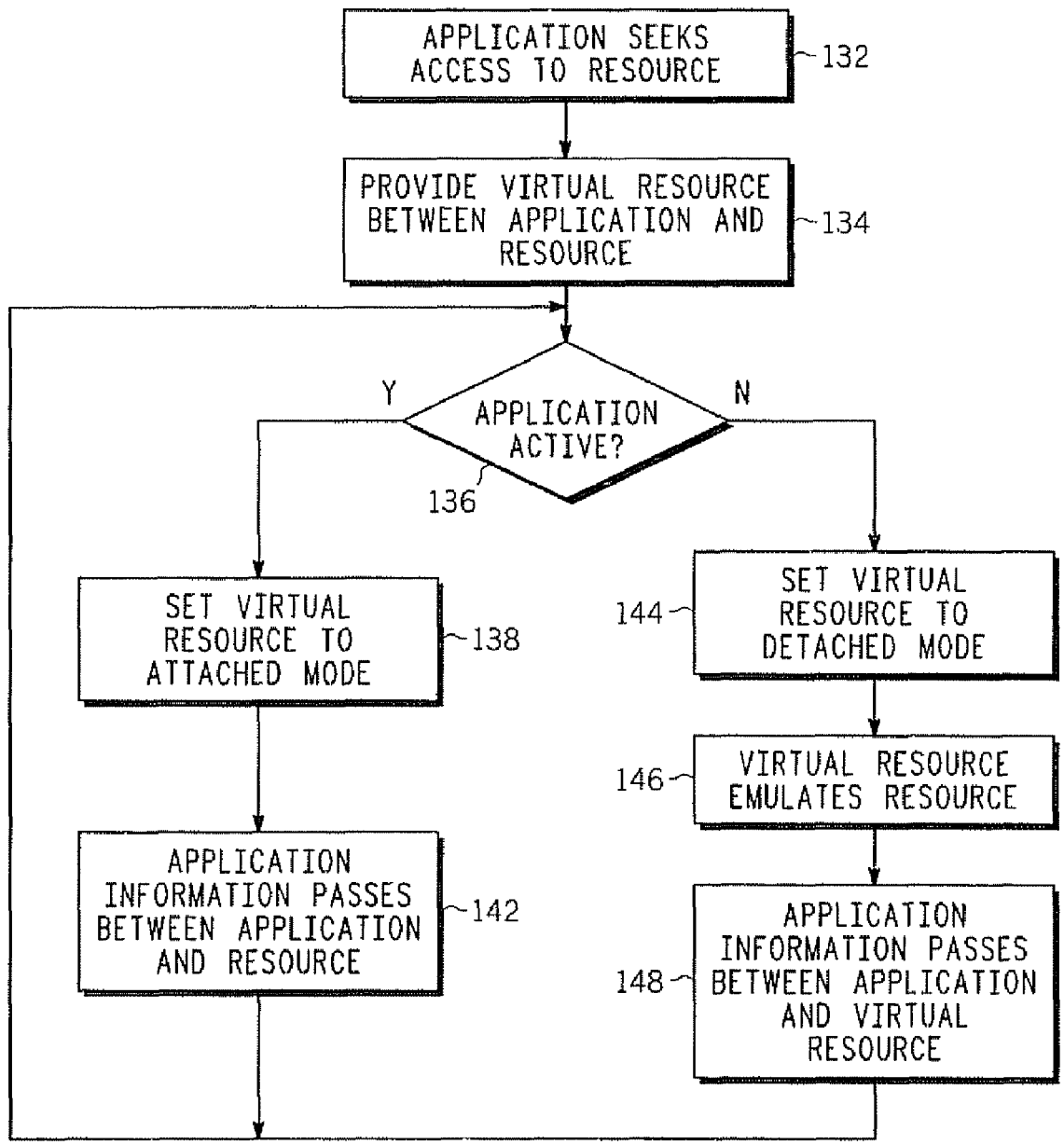
FIG. 6 is a flow chart that schematically illustrates a method for managing access to multimedia content system resources by multimedia content system applications.

Referring now to FIG. 6, with continuing reference to FIGS. 1-5, shown is a flow chart that schematically illustrates a method 130 for managing access to multimedia content system resources by multimedia content system applications. The method includes a step 132 of a system application seeking access to a system resource. As discussed hereinabove, a system application, such as the TV application 94 or the VOD application 96, seeks access to a system resource, such as a multimedia content stream decoder or an end user display device. The request for access to a system resource by a system application often is in response to end user input, e.g., via a handheld remote control unit.

The method 130 also includes a step 134 of providing, creating or allotting a virtual resource between a system application and a system resource. For example, the multimedia content processing device 12 is configured to create a virtual resource coupled between a system application requesting access to a system resource and the system resource to which the system application is requesting access. Although the creation and operation of a virtual resource typically has been discussed herein as something occurring partially or completely within the multimedia content processing device 12, it should be understood that the step 134 of providing the virtual resource can be performed partially or completely by one or more other suitable system components within the system 10. For example, all or a portion of the virtual resource providing step 134 can be performed by the multimedia content and/or within one or more network components within the network 14.

The method 130 also includes a step 136 of determining whether the system application seeking access to the system resource is an active application. As discussed herein, when multiple applications are running, e.g., in a multi-application environment, only one application can be active and interacting with the end user at any given time. The remaining applications are non-active or inactive applications. Non-active applications can still be running, although typically in the background only.

If the system application requesting system resource access is active or is the active application, the method 130 performs a step 138 of setting or configuring the virtual resource associated with the requesting application to the attached mode. In this manner, the virtual resource is "attached" to the actual resource to which the application was accessed or seeking access. When the virtual resource is attached or in the attached mode, the method 130 performs a step 142 of the virtual resource forwarding or passing through application information and commands from the associated application to the accessed resource. Also, depending on the type of application, the step 142 can include passing through information from the resource to the application. The information passed through from the application to the resource can include any suitable application information, such as commands from the application to the resource. In general, when in the attached mode, the virtual resource acts as if the associated application was coupled directly to the accessed resource.

Referring again to the step 136 of determining whether the system application seeking access to the system resource is active, if the system application is non-active or not an active application, the method 130 performs a step 144 of setting or configuring the virtual resource associated with the requesting application to the detached mode. In this manner, the virtual resource is or becomes "detached" from the actual resource to which the application is requesting access. When the virtual resource is in the detached mode, the method 130 performs a step 146 of the virtual resource emulating the actual or underlying resource to which the application is seeking access. The virtual resource emulates the actual resource in a manner that makes the system application believe that it always has access to the underlying actual resource.

When the virtual resource is emulating the actual underlying resource, the method 130 also performs a step 148 of passing application information and commands between the system application and the virtual resource. The step 148 is compared to the virtual resource passing application information through to the actual resource, i.e., when the virtual resource is in the attached mode (step 142). Emulation of the actual system resource by the virtual resource associated with the requesting non-active system application can involve receiving application information from the non-active system application, providing application information to the non-active system application, and/or generating or storing application information to provide to the non-active system application when the non-active system application becomes the active application.

For example, for the media processing Streamer resource discussed hereinabove, when the virtual (Streamer) resource is detached, emulation by the virtual resource can include calculating the position of the application's media stream if the media stream was being played (i.e., if the application was active) and storing the state the actual Streamer resource would be in if the application was active. When the virtual resource becomes attached, the virtual resource is configured to set or reset the actual Streamer resource, and to change the media stream to the "play" or "playback" process mode or state. The virtual resource also informs or otherwise provides the necessary instructions and playback position information to the actual Streamer resource to allow playback of the media stream at the calculated stream location or position, i.e., the particular position in the media stream at which the application would be if the application had been operating all along.

When a detached virtual resource becomes an attached virtual resource, the virtual resource can set and/or reset the actual resource to the state (e.g., the playback position) the actual resource would be in if the application would have had access to the actual resource, i.e., while the virtual resource was emulating the actual underlying resource. For example, as discussed hereinabove, if the VOD application 96 previously had been a non-active application, but now is the active application, the virtual resource (e.g., the virtual streamer 124) will instruct the actual resource (e.g., the Streamer 108) to start or resume playback at a calculated position that indicates in which position the VOD application 96 would be if the playback of the VOD application 96 had been going on all the time, e.g., in the background.

Although at least a portion of the resource management methods discussed herein generally are shown and described to be occurring within a multimedia content processing devices, such as set-top box, all or a portion of such methods can be partially or completely located and/or performed within one or more other portions of the overall system, e.g., by the multimedia content source and/or by or within one or more suitable components within the network 14. Also, although the resource management methods and devices discussed herein are described in the context of use with multimedia content processing devices, the use of virtual resources for resource access management can be applied to resources used in and associated with other devices and in other types of systems.

The method shown in FIG. 6 may be implemented in a general, multi-purpose or single purpose processor. Such a processor will execute instructions, either at the assembly, compiled or machine-level, to perform that process. Those instructions can be written by one of ordinary skill in the art following the description of FIG. 6 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the resource management devices and methods using virtual resources herein described without departing from the spirit and scope of the invention as defined by the appended claims and their full scope of equivalents.

The invention claimed is:

1. A method for managing access by a plurality of system applications within a multimedia content system to at least one system resource, comprising the steps of:
   providing, by a controller configured to receive multimedia content and coupled to a memory for storing at least a portion of the multimedia content, at least one virtual resource associated with at least one of the plurality of system applications for the at least one system resource, wherein the multimedia content can include system application information associated with at least one of the plurality of system applications, and wherein the at least one system application is an active application accessing a system resource or a non-active application seeking access to a system resource,
      wherein the virtual resource can be configured in an attached mode in which the virtual resource forwards multimedia content between the system resource and the associated active system application accessing the system resource,
      wherein the virtual resource can be configured in a detached mode in which the virtual resource emulates the system resource which the associated non-active system application is attempting to access, and
      wherein the virtual resource configured in the detached mode emulates the system resource by providing at least one of:
         an ability of the virtual resource to receive application information from a non-active system application,
         an ability of the virtual resource to provide application information to the non-active system application,
         an ability of the virtual resource to generate application information to provide to the non-active system application when the non-active system application becomes active, and
         an ability of the virtual resource to store application information to provide to the non-active system application when the non-active system application becomes active;
   configuring, by the controller, the virtual resource, upon activation of a system application, to the attached mode and coupling the virtual resource between the associated active system application and the accessed system resource;
   configuring, by the controller, the virtual resource, upon non-activation of a system application, to the detached mode and decoupling the virtual resource associated with the non-active system application from the system resource; and
   wherein the virtual resource provides to the system application an appearance that the system application always has access to the system resource, even if the system application is not active and does not have access to the system resource, and even if only the active system application has access to the system resource.

2. The method as recited in claim 1, wherein at least one of the system applications is configured to provide system application information to the at least one system resource, and wherein the virtual resource for the at least one system application emulates the associated system resource by receiving system application information from the system application intended for the associated system resource.

3. The method as recited in claim 1, wherein at least one of the system applications is configured to request system application information from the at least one system resource, and wherein the virtual resource for the at least one system application emulates the associated system resource by generating system application information in response to the request for system application information and, when the at least one system application becomes an active application, providing the generated system application information to the at least one system application requesting system application information.

4. The method as recited in claim 1, wherein at least one of the system applications is configured to receive system application information from at least one end user device, wherein the virtual resource for the at least one system application emulates the associated system resource by receiving the system application information provided by the at least one end user device and, when the at least one system application becomes an active application, providing the received system application information to the at least one system application.

5. The method as recited in claim 1, wherein at least one of the system applications is configured to provide system application information to the at least one system resource, and wherein, when the virtual resource is configured in the attached mode, the virtual resource forwards system application information received by the system application to the associated system resource.

6. The method as recited in claim 1, wherein at least one of the system applications becomes an active application based on a first input from an end user to the multimedia content system, and becomes a non-active application based on a second input from an end user to the multimedia content system.

7. The method as recited in claim 1, wherein at least a portion of at least one of the virtual resource providing step and the virtual resource configuring steps are performed in at least one of the multimedia processing device, a multimedia content provider providing multimedia content to the multimedia processing device, and a multimedia content network coupled between the multimedia content provider and the multimedia processing device.

8. The method as recited in claim 1, wherein at least one of the system applications is a multimedia content player configured to provide, receive or request system application information, and wherein the system application information can include at least one of an actual multimedia content playback position, a calculated multimedia content playback position, an end-of-stream command, and a trick play function command.

9. The method as recited in claim 1, wherein at least one of the system applications is selected from the group consisting of a television (TV) application, a video on demand (VOD) application, an electronic program guide (EPG) application, a web browser application, a teletext application, and a settings application.

10. The method as recited in claim 1, wherein at least one of the system resources is selected from the group consisting of an end user display device, a television monitor, a computer monitor, a multimedia content streamer, a multimedia content player, a multimedia content decoder, and a multimedia content encoder.

11. A device for managing access by a plurality of system applications within a multimedia content system to at least one system resource, comprising:
  a controller configured to receive multimedia content, wherein the multimedia content can include system application information associated with at least one of the plurality of system applications; and
  at least one memory coupled to the controller for storing at least a portion of the multimedia content received by the device;
  wherein the controller is configured to provide at least one virtual resource associated with the at least one of the plurality of system applications for the at least one system resource,
  wherein the controller is configured to couple the at least one virtual resource between the at least one system resource and at least one of the plurality of system applications,
  wherein the controller can switch the virtual resource between an attached mode in which the virtual resource forwards multimedia content between the system resource and the associated system application accessing the system resource, and a detached mode in which the virtual resource emulates the system resource which a system application is attempting to access, further wherein the virtual resource in the detached mode emulates the system resource by providing at least one of:
    an ability of the virtual resource to receive application information from a non-active system application,
    an ability of the virtual resource to provide application information to the non-active system application,
    an ability of the virtual resource to generate application information to provide to the non-active system application when the non-active system application becomes active, and
    an ability of the virtual resource to store application information to provide to the non-active system application when the non-active system application becomes active;
  wherein when a system application becomes active, the controller switches the virtual resource to the attached mode and couples the virtual resource for the active system application to the accessed system resource,
  wherein when a system application becomes non-active, the controller switches the virtual resource to the detached mode and decouples the virtual resource for the non-active system application from the system resource; and
  wherein the virtual resource provides to the system application an appearance that the system application always has access to the system resource, even if the system application is not active and does not have access to the system resource, and even if only the active system application has access to the system resource.

12. The device as recited in claim 11, wherein at least one of the system applications is configured to provide system application information to the at least one system resource, and wherein the controller configures the virtual resource for the at least one system application to emulate the system resource by receiving system application information from the system application intended for the system resource.

13. The device as recited in claim 11, wherein at least one of the system applications is configured to request system application information from the at least one system resource, and wherein the controller configures the virtual resource for the at least one system application to emulate the system resource by generating system application information in response to the request for system application information and, when the at least one system application becomes active, providing the generated system application information to the at least one system application requesting system application information.

14. The device as recited in claim 11, wherein at least one of the system applications is configured to receive system application information from at least one end user device, wherein the controller configures the virtual resource for the at least one system application to emulate the system resource by receiving the system application information provided by the at least one end user device and, when the at least one system application becomes active, providing the received system application information to the at least one system application.

15. The device as recited in claim 11, wherein at least one of the system applications is configured to provide system application information to the at least one system resource, and wherein, when the controller switches the virtual resource to the attached mode, the virtual resource forwards system application information received by the system application to the system resource.

16. The device as recited in claim 11, wherein at least one of the system applications becomes active based on a first input from an end user to the multimedia content system, and becomes non-active based on a second input from an end user to the multimedia content system.

17. The device as recited in claim 11, wherein at least one of the system applications is a multimedia content player configured to provide, receive or request system application information, and wherein the system application information can include at least one of an actual multimedia content playback position, a calculated multimedia content playback position, an end-of-stream command, and a trick play function command.

18. The device as recited in claim 11, wherein at least a portion of the at least one system resource is at least one of contained within the device, and external to the device and coupled thereto.

19. The device as recited in claim 11, wherein at least a portion of the device is contained in a multimedia processing device.

20. The device as recited in claim 19, wherein the multimedia processing device is selected from the group consisting of a signal converter box, a signal decoder box, a digital video recorder, a digital video disk recorder, a personal video recorder device, a home media server, a digital video server, a residential gateway, a video receiver and a computer.

* * * * *